June 11, 1968  I. B. D. JOHNSON  3,388,242
APPARATUS FOR CALCULATING THE WEIGHTED
AVERAGE OF TWO OR MORE NUMBERS
Filed April 10, 1964
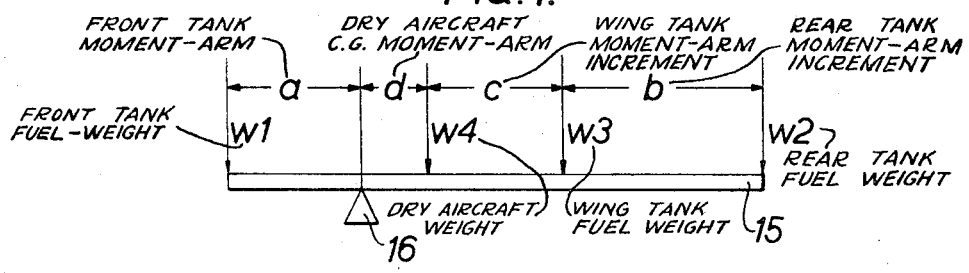
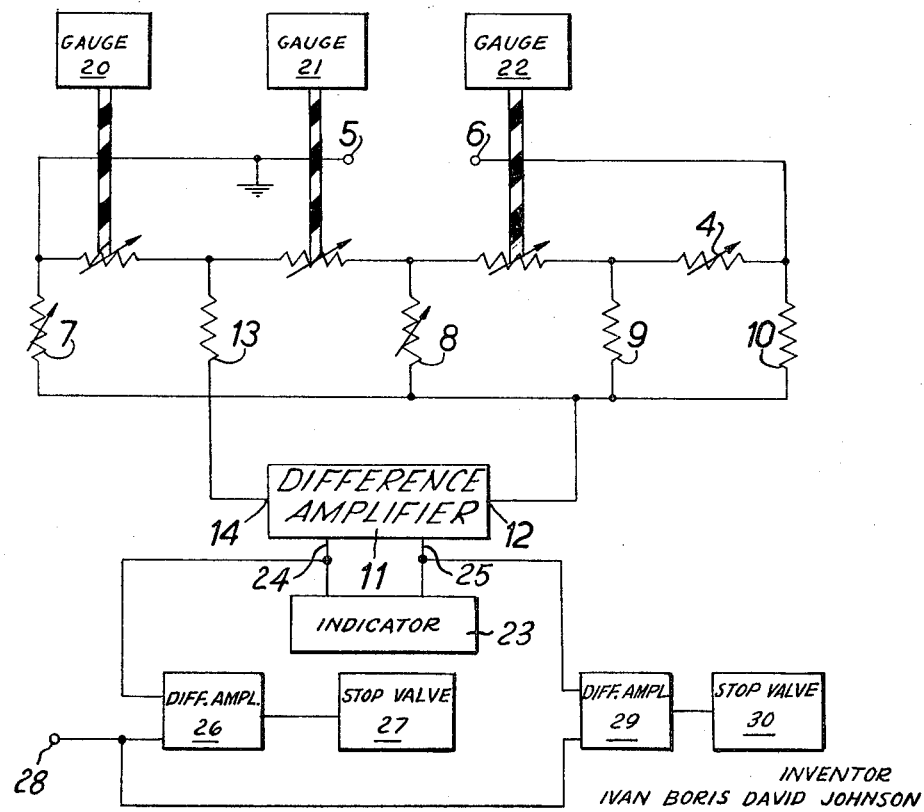

United States Patent Office 3,388,242
Patented June 11, 1968

3,388,242
APPARATUS FOR CALCULATING THE WEIGHTED
AVERAGE OF TWO OR MORE NUMBERS
Ivan Boris David Johnson, Guildford, Surrey, England,
assignor to S. Smith & Sons (England) Limited, Crickle-
wood, London, England, a British company
Filed Apr. 10, 1964, Ser. No. 358,898
Claims priority, application Great Britain, Apr. 18, 1963,
15,217/63
8 Claims. (Cl. 235—184)

---

An electric analog network calculates the displacement of an aircraft's center of gravity from a datum position. The weight of fuel in each of the aircraft's fuel tanks is represented by an individual resistance in a resistance-chain of the network. Voltage is applied across the chain, and resistors connected from a common line to individual points in the chain have conductances dependent upon the moment-arms of the individual weights about the datum position. A difference amplifier, connected between the common line and a point in the chain corresponding to the datum position, supplies a signal representative of the displacement.

---

This invention relates to apparatus for calculating the weighted average of two or more numbers. The weighted average given by the formula:

$$h=\frac{(|a_1A_1|\cdots+|a_rA_r|\cdots+|a_nA_n|)-(|b_1B_1|\cdots+|b_pB_p|\cdots+|b_qB_q|)}{(A_1+A_2\cdots+A_r\cdots+A_n)+(B_1+B_2\cdots+B_p\cdots+B_q)}$$

where $h$ is the weighted average, $A_1$ through $A_n$ and $B_1$ through $B_q$ are the numbers, and $a_1$ through $a_n$ and $b_1$ through $b_q$ are the weightings applied to the numbers $A_1$ through $A_n$ and $B_1$ through $B_q$ respectively, the sign of the product $a_rA_r$ being positive and the sign of the product $b_pB_p$ is negative, $r$ being any integer between 1 and $n$, $p$ is any integer between 1 and $q$, and where $$a_1<a_2\ldots<a_r\ldots<a_n$$

and $$b_1<b_2\ldots<b_p\ldots<b_q$$

Such apparatus may, for example, be used to calculate the displacement in a reference direction of the center of gravity of at least two bodies from a datum position. In this case $A_1$ represents the weight of the nearest body in the reference direction, $a_1$ represents the displacement in the reference direction of the center of gravity of that body from the datum position, $B_1$ represents the weight of the nearest body in the opposite direction to the reference direction, $b_1$ represents the displacement in the opposite direction to the reference direction of the center of gravity of that body from the datum position, and $A_2 \ldots A_n$ and $B_2 \ldots B_q$, and $a_2 \ldots a_n$ and $b_2 \ldots b_q$ represent the weights of further bodies and their displacement in the reference direction and in the opposite direction from the datum position.

According to this invention, apparatus for calculating the weighted average of two or more numbers comprises resistors connected in series and adapted to be connected across a voltage source, the resistance of each resistor being proportional to one of the numbers, the resistors being connected so that they represent the numbers in the order $A_1, A_2, .A_r, .A_n, B_q, B_{q-1}, .B_p, .B_1$, the junction of the resistors representing the numbers $A_n$ and $B_q$ being connected to a first terminal, the junction of every other pair of resistors representing the numbers $A_r$ and $A_{r-1}$ or $B_p$ and $B_{p-1}$ being connected to a second terminal through a resistor the conductance of which is proportional to $a_r-a_{r-1}$ or $b_p-b_{p-1}$ respectively, and the ends of the resistors representing $A_1$ and $B_1$ which, in operation, are connected to the voltage source being connected to the second terminal through resistors the conductances of which are proportional to $a_1$ and $b_1$ respectively.

The potential difference which appears, in operation, between the first and second terminals is proportional to the weighted average $h$.

Preferably the apparatus also comprises a difference amplifier connected so as to amplify the potential difference between the first and second terminals.

Preferably the junction of the resistors representing the numbers $A_n$ and $B_q$ is connected to the first terminal through a resistor.

Apparatus for calculating the displacement of the center of gravity of an aircraft in a reference direction from a datum position will now be described with reference to the accompanying drawings.

FIGURE 1 is a schematic representation of the forces exerted by the weights of the dry aircraft and of the fuel in the various tanks in the aircraft.

FIGURE 2 is a circuit diagram of the apparatus.

Referring to FIGURE 1, the aircraft is represented as a beam 15 and the datum position as a pivot 16. The weight of the fuel in the front fuselage tanks of the aircraft is represented by a force W1, and the displacement of its center of gravity in the reference direction from the datum position is represented by length $a$. The weight of the dry aircraft is represented by a force W4, and the displacement of its center of gravity in the reference direction from the datum position is represented by a length $d$. The weight of the fuel in the wing tanks of the aircraft is represented by a force W3, and the displacement of its center of gravity in the reference direction from the datum position is represented by a length $c+d$. The weight of the fuel in the rear fuselage tanks of the aircraft is represented by a force W2, and the displacement of its center of gravity in the reference direction from the datum position is represented by a length $b+c+d$.

Referring now to FIGURE 2, four variable resistors 1, 2, 3, and 4 are connected in series between ground terminal 5 and a terminal 6. The terminal 5, the junction of the resistors 2 and 3, the junction of the resistors 3 and 4, and the terminal 6 are connected through a variable resistor 7, a variable resistor 8 and resistors 9 and 10 respectively to one input terminal 12 (constituting the previously mentioned second terminal) of a difference amplifier 11. The junction of the resistors 1 and 2 is connected through a resistor 13 to the other input terminal 14 (constituting the previously mentioned first terminal) of the difference amplifier 11. In use, the terminals 5 and 6 are connected across a D.C. voltage source.

The wiper of the variable resistor 1 is connected to a fuel contents gauge 20 which measures the weight of the fuel in the front fuselage tanks so that its resistance is dependent on the weight of the fuel in the front tanks, and the variable resistor 7 is set so that its conductance is proportional to the displacement of the center of gravity of the fuel in the reference direction from the datum position. The position of the center of gravity of the fuel in the front fuselage tanks is partially dependent on the weight of the fuel in said front tanks, and the variable resistance 1 is constructed so that its resistance for any particular weight of fuel is such that it compensates for any change in the position of the center of gravity. The variable resistor 4 is set so that its resistance is proportional to the weight of the dry aircraft, and the conductance of the resistor 10 is arranged to be proportional to the displacement in the reference direction of the center of gravity of the dry aircraft from the datum position. The wiper of the variable resistor 3 is connected to a fuel contents gauge 22 which measures the weight of fuel in the wing tanks of the aircraft so that the resistance of the resistor 3 is proportional to the weight of fuel in said wing tanks, and the conductance of the resistor 9 is arranged to be proportional to the displacement in the reference direction of the center of gravity of the fuel in said wing tanks from the center of gravity of the dry aircraft. The wiper of the variable resistor 2 is connected to a fuel contents gauge 21 which measures the weight of fuel in the rear tanks of the aircraft so that the resistance of the resistor 2 is proportional to the weight of the fuel in said rear tanks. The variable resistor 8 is set so that its conductance is proportional to the displacement in the reference direction of the center of gravity of the fuel in the rear tanks from the center of gravity of the fuel in the wing tanks. The gauges 20, 21, and 22 may be similar to the liquid contents gauge shown in FIGURE 2 of British Patent No. 695,074.

The resistances of the resistors 7, 8, 9, 10 and 13 are such that they have a negligible shunting effect on the resistors 1, 2, 3 and 4. The input impedance of the difference amplifier 11 is very high in comparison to the resistors 7, 8, 9, 10 and 13.

The weight of the fuel in the front fuselage tanks is represented by $A_1$, and the distance of its center of gravity from the datum position is represented by $a_1$. The weight of the dry aircraft, the fuel in the wing tanks, and the fuel in the rear fuselage tanks are represented by $B_1$, $B_2$ and $B_3$ respectively and the distances of their respective centers of gravity from the datum position are represented by $b_1$, $b_2$ and $b_3$ respectively. The resistors 1, 2, 3 and 4 represent the number $A_1$, $B_3$, $B_2$ and $B_1$ respectively, and the resistors 7, 8, 9 and 10 represent the numbers $a_1$, $b_3-b_2$, $b_2-b_1$ and $b_1$ respectively.

The difference between the potentials at the terminals 12 and 14 represents the number $h$ and is proportional to the distance of the center of gravity of the aircraft from the datum position.

The output of the amplifier 11 which is proportional to the displacement of the center of gravity of the aircarft from the datum position 16 is fed over two lines 24 and 25 to an indicator 23 which is calibrated in units of distance, e.g., feet and inches. The lines 24, and 25 are at positive and negative potentials respectively with respect to a datum potential. The potential of line 24 is fed together with that of the datum potential at a terminal 28 to a difference amplifier 26 which controls a stop valve 27. The valve 27, when operated, prevents the flow of fuel out of the front tanks. The amplifier 26 operates the valve 27 when the center of gravity moves too far to the rear of the craft. Similarly, the potential of the terminal 28 and the line 25 are fed to a difference amplifier 29 which controls a stop valve 30. When the stop valve 30 is operated, fuel cannot flow out of the front tanks of the aircraft. The amplifier 29 operates the valve 30 when the center of gravity moves too far to the front of the aircraft.

In a modification, the wipers of the variable resistors 1, 2 and 3 are not connected to the gauges 20, 21 and 22, but are connected to the flow meters which measure the weights of the fuel in the various tanks.

In another modification, the position of the center of gravity of the aircraft is calculated by apparatus which, employs fuel contents gauges to measure the weights of the fuel in the tanks and by apparatus which employs flow meters to measure the weights of fuel in the tanks. Warning means are provided which give a signal when the two positions calculated differ by more than a predetermined distance.

In a further modification, means are provided which may be operated to apply a bias signal to one of the input terminals of the amplifier 11 so that the amplifier controls the valves 27 and 30 in such a way that the center of gravity of the aircraft is maintained at a predetermined distance from the datum position.

In yet another modification, means are provided to apply a bias signal to the output terminal of the amplifier 11 so that the amplifier 11 controls the valves 27 and 30 in such a way that the center of gravity of the aircraft is maintained at a predetermined distance from the datum position. The indicator 23 then indicates the displacement of the center of gravity from the datum position.

Having thus described my invention, I claim:

1. An electric network for calculating the weighted average of an ordered set of numbers where the weighting applicable to each successive number of the set differs by an increment from the weighting applicable to the preceding number of the set, said network comprising: a set of electrical resistance-conductance combinations, each said resistance-conductance combination comprising a first terminal, a second terminal, an electrical resistance coupled between said first and second terminals, a third terminal, and an electrical conductance coupled between said second and third terminals, said resistance having a value in accordance with a respective one of said numbers and said conductance having a value in accordance with the weighting increment applicable to this respective number in said ordered set; means intercoupling said resistance-conductance combinations in an ordered sequence correlated to the order of said set of numbers, said intercoupling means comprising first connection means interconnecting the said first and second terminals of said resistance conductance combinations to connect the said resistances of said combinations in series with one another, there being at least one said first connection means connecting the said second terminal of one said resistance-conductance combination to the said first terminal of another of said resistance-conductance combinations, and second connection means providing a common connection to the said third terminals of each said resistance-conductance combination; means for applying a voltage across the serially-connected resistance; and voltage-sensitive means having a first input terminal connected to the said first terminal of said one resistance-conductance combination, and a second input terminal connected to said common connection, said voltage-sensitive means being responsive to a voltage-signal appearing between its first and second input terminals to provide an output representation of said weighted average in accordance with said voltage-signal.

2. An electric network according to claim 1 including a resistor coupling said first input terminal of the voltage-sensitive means to said first terminal of said one resistance-conductance combination.

3. Apparatus for calculating the displacement of the center of gravity of an aircraft in a reference direction from a datum position wherein the weights of spaced first quantities of fuel in said aircraft are represented by the numbers $A_1, A_2, \ldots A_r, \ldots A_n$ and the displacements of the respective centers of gravity of said first quantities of fuel in the reference direction from the datum position are represented by the numbers $a_1, a_2, a_3, \ldots a_r, \ldots a_n$, where $a_1 < a_2 \ldots < a_n$, and wherein the weights of spaced second quantities of fuel in said aircraft are represented by the numbers $B_1, B_2 \ldots B_p, \ldots B_q$ and the displacements of the respective centers of gravity of said second quantities of fuel in the opposite direction to the reference direction from the datum position are represented by the numbers $b_1, b_2, \ldots b_p, \ldots b_q$, where $b_1 < b_2 \ldots < b_p \ldots b_q$, comprising a plurality of resistors connected in a series chain, the resistance of each resistor being proportional to one of the numbers respectively, and the resistors being connected so that they represent the numbers in the order $A_1, A_2, \ldots A_r, \ldots A_n, B_q, B_{q-1}, \ldots B_p, \ldots B_1$ between first and second ends of the series chain; means for applying a voltage between said first and second ends of said series chain; voltage-sensitive means having first and second input terminals and responsive to the voltage difference between said first and second input terminals to provide an output representation of said voltage difference; means connecting the junction between the resistors representing the numbers $A_n$ and $B_q$ in said chain to said first input terminal; means establishing individual connections from said second input terminal to junctions between the resistors representing the numbers $A_r$ and $A_{r-1}$, and $B_p$ and $B_{p-1}$ in said chain, each said individual connection including a resistor the conductance of which is proportional to $a_r - a_{r-1}$ or $b_p - b_{p-1}$ respectively; a resistor having a conductance proportional to $a_1$ connected between said first end of said series chain and said second input terminal of said voltage-sensitive means; and a resistor having a conductance proportional to $b_1$ connected between said second end of said series chain and said second input terminal of said voltage-sensitive means.

4. Apparatus according to claim 3 including a further resistor connected between said first input terminal of said voltage-sensitive means and said junction of the resistors representing the numbers $A_n$ and $B_q$.

5. In an aircraft having a plurality of spaced fuel tanks, apparatus according to claim 3 including control means responsive to the voltage difference appearing between said first and second input terminals of said voltage-sensitive means, said control means including valve means for controlling the flow of fuel from each one of said plurality of fuel tanks to maintain the center of gravity of the aircraft at a predetermined position.

6. Apparatus according to claim 5 including indicator means for providing an indication in accordance with said output representation of said voltage-sensitive means.

7. Apparatus according to claim 3 wherein the values of the resistors representing the numbers $A_1$ through $A_n$ and $B_1$ through $B_q$ are variable, the resistance values of said resistors being set by fuel measuring means operative to measure the weights of respective ones of said quantities of fuel.

8. Apparatus according to claim 3 wherein $n=1$ and $q=3$.

References Cited
UNITED STATES PATENTS 2,982,133   5/1961   Haskell et al. ___ 235—150.21 X
3,153,143   10/1964   Fogarty _____ 235—150.21

MALCOLM A. MORRISON, *Primary Examiner.*

J. RUGGIERO, *Assistant Examiner.*